United States Patent [19]

Simanski

[11] 4,419,921
[45] Dec. 13, 1983

[54] PIANO KEYBOARD SHIELD

[76] Inventor: Edward G. Simanski, 3005 Spruce Ave., Altoona, Pa. 16601

[21] Appl. No.: 385,509

[22] Filed: Jun. 7, 1982

[51] Int. Cl.³ .............................................. G09B 15/06
[52] U.S. Cl. ....................................... 84/467; D17/9; 84/178; 84/453; 400/714
[58] Field of Search ................ D17/2, 9; 84/178–180, 84/453, 465, 467, 469; 400/714

[56] References Cited

U.S. PATENT DOCUMENTS

| D. 248,993 | 8/1978 | Oliver et al. | D17/9 |
| 1,260,601 | 3/1918 | Vallely | 84/467 |
| 2,298,799 | 10/1942 | McClintock | 84/467 |

FOREIGN PATENT DOCUMENTS 938672  2/1956  Fed. Rep. of Germany ...... 400/714

Primary Examiner—Lawrence R. Franklin
Attorney, Agent, or Firm—Weiser & Stapler

[57] ABSTRACT

A unitary keyboard shield adapted to be attached to a piano of the type having a laterally extending gap, or slot in a vertical section located at the rear of the keyboard. The shield includes a rear section engageable within the slot for attaching the shield to the piano, and a cover portion adapted to interrupt a player's line of vision to at least a portion of the keyboard when the shield is so attached.

5 Claims, 2 Drawing Figures

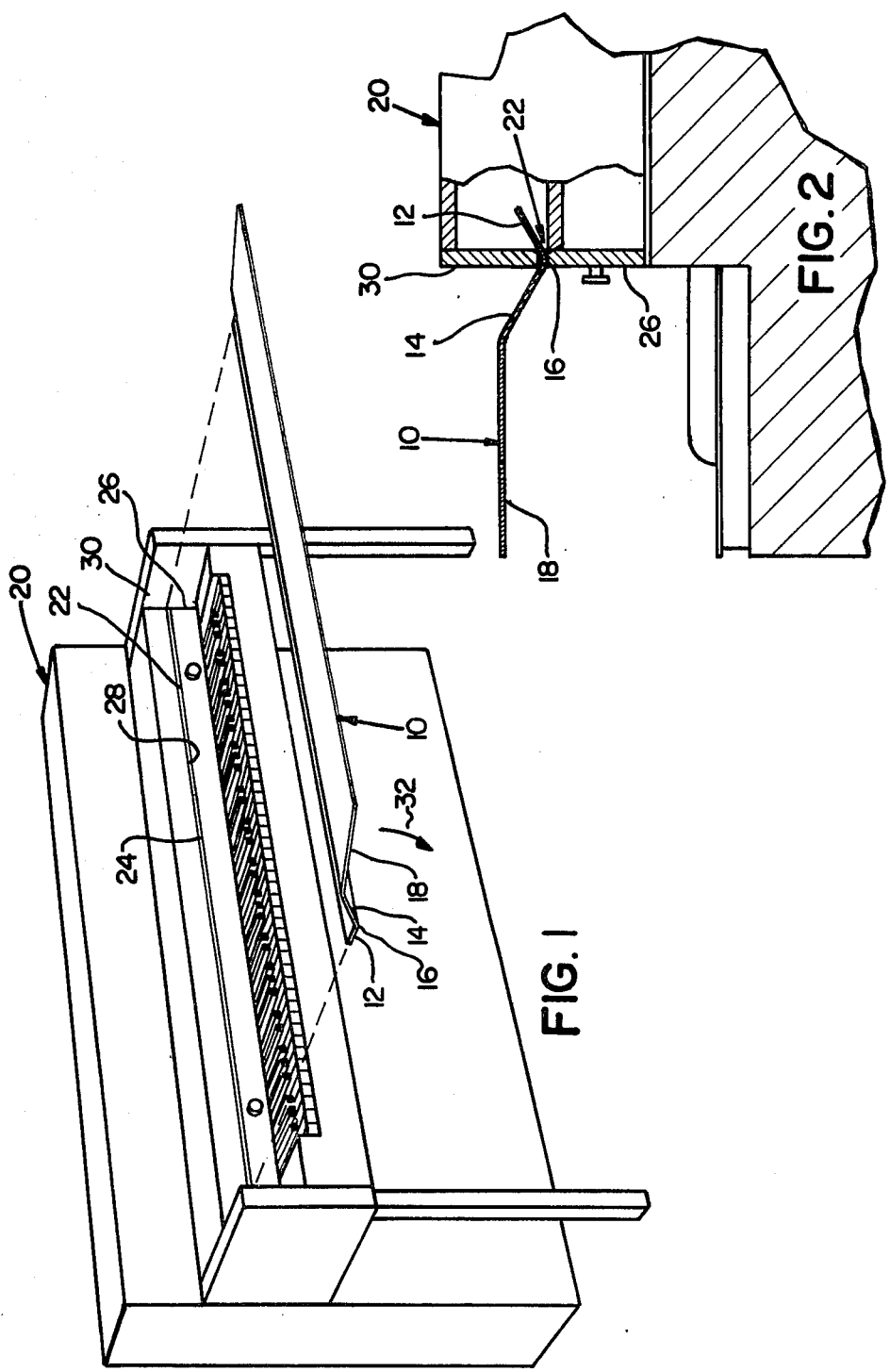

PIANO KEYBOARD SHIELD

FIELD OF THE INVENTION

This invention relates generally to a piano keyboard shield for interrupting a player's line of vision to at least a portion of the keyboard.

BACKGROUND ART

A person initially learning to play the piano should be encouraged not to watch the keyboard when playing. Rather, he should be taught to learn the location of the various keys by touch, similar to the approach used in teaching typing. Once the individual becomes comfortable with his knowledge of the key locations, he will be able to focus virtually all his visual attention on reading the music.

U.S. Pat. No. 2,298,799 issued to McClintock, teaches one type of keyboard cover for obstructing a player's line of sight to at least a portion of the keyboard. This provides an artificial aid to force the learner to rely upon the touch system in locating keys, since he is unable to actually see the keys through the overlying cover. In the McClintock structure a shelf 14, formed of a bent piece of fiberboard, overlies the keys to obstruct the player's line of sight thereto. The shelf is held in position by bracket-like supports 18 which fit in the narrow gaps between the piano keys and rest on the substructure beneath the keys. Each of the supports 18 includes a notch 28 to provide clearance for the hands and fingers of the player. However, each of the bracket-like supports 18 actually can frictionally interfere with the operation of the piano keys adjacent to it.

The present invention represents a significant improvement over the cover disclosed in McClintock by eliminating all contact between the shield and the keys.

DISCLOSURE OF THE INVENTION

A unitary keyboard shield in accordance with this invention is adapted to be attached to a piano having a laterally extending gap, or slot in a vertical section located at the rear of the keyboard, said shield, when attached to the piano, including a cover portion for interrupting a player's line of vision to at least a portion of the keyboard, said shield including a rear section engageable within the slot for attaching the shield to the piano.

The above-described arrangement avoids the necessity of positioning any elements of the shield in the narrow gaps between the keys of the keyboard. Thus, the keyboard shield of this invention does not interfere, in any way, with the operation of any of the keys when an individual is playing the piano.

Throughout this application all references to the position and/or orientation of the various sections of the shhield will refer to the positions and/or orientations occupied by these sections when the shield is attached to the piano.

In the most preferred embodiment of this invention the rear section is inclined upwardly and rearwardly, and is generally thinner than the thickness of the laterally extending gap or slot in the vertical section at the rear of the keyboard. This dimensional relationship permits the rear section of the shield to be inserted into the slot without frictionally rubbing against, and possibly damaging wood surfaces of the piano.

Most preferably the cover portion of the shield includes an upwardly and forwardly inclined intermediate section constituting a continuous extension of the rear section, and forming a laterally extending edge at its junction with said rear section. A horizontal, substantially planar front section forms a continuous extension of the intermediate section and provides sufficient clearance above the keyboard for accommodating the hands and fingers of the player. The laterally extending edge joining the rear section of the shield to the intermediate section, when the shield is connected to the piano, engages a lower surface of the laterally extending slot, and the rear section of the shield is biased into engagement with the rear edge of the upper surface of said slot.

Other objects and advantages of this invention will become apparent by referring to the description of the Best Mode of the Invention taken in conjunction with the drawings.

BRIEF DESCRIPTION OF THE DRAWINGS

FIG. 1 is an exploded isometric view showing the unitary keyboard shield of this invention separated from the piano to which it is to be attached, but oriented in a position for easy attachment thereto; and FIG. 2 is a sectional view showing the shield attached to the piano.

BEST MODE OF THE INVENTION

Referring to FIGS. 1 and 2, the unitary keyboard shield 10 of this invention preferably is formed of a plastic material, such as acrylic. This shield includes an upwardly and rearwardly inclined, substantially flat rear lip section 12 joined to an upwardly and forwardly inclined intermediate section 14 through a laterally extending edge 16. A substantially horizontal, planar front section 18 forms a continuous extension of the inclined intermediate section 14, and with said intermediate section, constitutes a cover portion adapted to overlie at least a portion of the piano keyboard for interrupting a player's line of sight to the keys. The shield 10 can be fabricated easily by cutting a substantially planar sheet of acrylic, and then molding it into the desired shape by the application of heat and pressure.

The keyboard shield 10 of this invention is adapted to be employed with a piano 20 of the type including a slot, or gap 22 located in a vertical section, or backboard at the rear of the keyboard. In the illustrated embodiment this slot 22 is the space provided between the upper wall 24 of a slidable lid 26 employed to cover the keys when the piano is not in use, and a vertically spaced, lower wall 28 of an adjacent, vertical panel 30.

Referring specifically to FIG. 1, the keyboard shield 10 is shown in its desired orientation for insertion into the slot 22. Specifically, the rear lip section 12 is positioned so that it lies in substantially the same plane as the slot 22. This lip is then inserted into the slot until the lateral edge 16 prevents further inward motion. Thereafter the shield is rotated gently in the direction of arrow 32 to cause the laterally extending edge 16 thereof to slide into engagement with the upper wall 24 of the lid 26, and thereby occupy the position illustrated in FIG. 2. In the preferred embodiment of this invention the lip section 12 is thinner than the slot 22 to avoid damaging the wood surfaces defining the slot as the shield is being attached to the piano.

Note that the moment created by the intermediate and front sections 14 and 18 also is in the direction of arrow 32, and this moment tends to force the inclined lip section 12 into a position overlying and engaging the rear edge of the panel 30 to thereby establish a firm, yet removable attachment to the piano. Most preferably the rear lip section 12 and inclined intermediate section 14 provide a substantially V-shaped configuration, in cross-section, that closely bridges, or embraces the vertical panel 30. This provides an extremely stable connection to the piano.

The shield 10 can be removed easily from the piano by merely rotating it in a direction opposite to arrow 32. This will cause the lower lateral edge 16 to slide forwardly, out of engagement with the upper wall 24 of lid 26. Thereafter, the lip section 12 can be slid out of the slot 22 quite easily.

It is important that the clearance between the shield 10 and the front end of the keyboard be sufficient to accommodate the player's hand without interference. In accordance with this invention the particular slope and/or length of the intermediate section 14 will determine the clearance between the front end of the keyboard and the horizontal front section 18 of the shield. Most preferably the slope of the intermediate section 14 is chosen so that the V-shaped, cross-sectional configuration between the intermediate section and rear lip section 12 closely confines the vertical panel 30. The particular location of the gap, or slot 22 relative to the upper surface of the keys actually will dictate the vertical spacing that is required between the lateral edge 16 and the front section 18 of the shield for establishing the desired clearance. This, in turn, is controlled by the slope and/or length of the intermediate section 14.

Although the present invention has been described with reference to the particular embodiment herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed as the invention is:

1. A unitary keyboard shield adapted to be attached to a piano of the type having a laterally extending gap, or slot, in a vertical section located at the rear of the keyboard, said shield, when attached to the piano, including a cover portion interrupting a player's line of vision to at least a portion of said keyboard, the improvement wherein said shield includes a rear section engageable within said slot for attaching the shield to the piano, said rear section being substantially planar, thinner than the slot, and inclined upwardly and rearwardly.

2. The keyboard shield of claim 1 wherein the cover portion interrupting the player's line of vision includes an upwardly and forwardly inclined section unitarily joined to the rear section at a laterally extending edge.

3. The keyboard shield of claim 2 wherein the cover section further includes a substantially horizontal, planar front section forming a continuous extension of the upwardly and forwardly inclined intermediate section.

4. The combination of a unitary keyboard shield and a piano of the type having a laterally extending gap or slot in a vertical section located at the rear of the keyboard, said shield having a rear section engaged within said slot and a cover portion overlying the keyboard for interrupting a player's line of vision to at least a portion of said keyboard, said cover portion including an upwardly and forwardly inclined section unitarily joined to the rear section at a laterally extending edge, said rear section being inclined upwardly and rearwardly, the laterally extending slot being defined by upper and lower surfaces, the laterally extending edge of said shield being in engagement with the lower surface of the slot, and the upwardly and rearwardly inclined rear section of the shield overlying a rear edge of the upper surface of the slot.

5. The combination of claim 4, further including a horizontal planar front section forming a continuous extension of the upwardly and forwardly inclined section and being spaced vertically above the keyboard to provide sufficient clearance for accommodating the hands of the player.

* * * * *